(12) United States Patent
Myokei

(10) Patent No.: US 9,278,702 B2
(45) Date of Patent: Mar. 8, 2016

(54) TRAIN CONTROL SYSTEM

(71) Applicant: THE NIPPON SIGNAL CO., LTD., Tokyo (JP)

(72) Inventor: Kenichi Myokei, Kuki (JP)

(73) Assignee: THE NIPPON SIGNAL CO., LTD., Tokyo (JP)

( * ) Notice: Subject to any disclaimer, the term of this patent is extended or adjusted under 35 U.S.C. 154(b) by 2 days.

(21) Appl. No.: 14/228,171

(22) Filed: Mar. 27, 2014

(65) Prior Publication Data

US 2014/0209752 A1    Jul. 31, 2014

Related U.S. Application Data

(63) Continuation of application No. PCT/JP2012/074285, filed on Sep. 21, 2012.

(30) Foreign Application Priority Data

Sep. 30, 2011    (JP) .................. 2011-218254

(51) Int. Cl.
*B61L 3/08*    (2006.01)
*B61L 25/02*    (2006.01)
(Continued)

(52) U.S. Cl.
CPC ............... *B61L 3/08* (2013.01); *B61L 25/026* (2013.01); *B60L 2200/26* (2013.01); *B60L 2240/12* (2013.01); *B60L 2240/62* (2013.01); *B60L 2240/70* (2013.01); *B61L 3/008* (2013.01); *B61L 3/125* (2013.01); *B61L 27/0038* (2013.01);
(Continued)

(58) Field of Classification Search
CPC ........... B61L 3/08; B61L 3/125; B61L 3/121; B61L 25/026; B61L 25/025; B61L 25/02; B61L 2240/12; B61L 2240/62; B61L 29/282; B61L 23/04

See application file for complete search history.

(56) References Cited

U.S. PATENT DOCUMENTS 6,230,085 B1 *  5/2001  Oguma et al. .................. 701/19
6,317,664 B2 * 11/2001  Oguma et al. .................. 701/19
(Continued)

FOREIGN PATENT DOCUMENTS

| EP | 0638469 A2 | 2/1995 |
|---|---|---|
| EP | 0822909 A1 | 2/1998 |
| JP | 2000-016292 A | 1/2000 |

OTHER PUBLICATIONS

Extended European search report dated Nov. 9, 2015, which issued in European Application No. 12835183.0.

*Primary Examiner* — Jason C Smith
(74) *Attorney, Agent, or Firm* — McDermott Will & Emery LLP

(57) ABSTRACT

A train control system includes an on-board device 3 mounted on a train 2; a vehicle radio set 4; wayside radio sets 5 that are disposed on a ground; and ground devices 6 disposed in every control sections defined on the track. In each control section, the ground device 6 is connected to the wayside radio sets 5 in the control section. When one ground device 6 fails to transmit information to and receive information from another ground device 6, the one ground device 6 determines that said another ground device 6 has been failed, and then, the one ground device 6 calculates a possible travel distance to a control section of the failed ground device 6 to prevent the train 2 from entering the control section of the failed ground device 6, and then, the one ground device 6 transmits the possible travel distance to the on-board device 3.

13 Claims, 3 Drawing Sheets

(51) Int. Cl.
*B61L 3/00* (2006.01)
*B61L 3/12* (2006.01)
*B61L 27/00* (2006.01)

(52) U.S. Cl.
CPC ............. *Y02T10/7291* (2013.01); *Y02T 90/16* (2013.01); *Y02T 90/162* (2013.01)

(56) References Cited

U.S. PATENT DOCUMENTS

| | | | |
|---|---|---|---|
| 6,381,506 B1 * | 4/2002 | Grappone | 700/79 |
| 6,556,898 B2 * | 4/2003 | Clawson | 701/19 |
| 7,075,427 B1 * | 7/2006 | Pace et al. | 340/539.22 |
| 8,032,078 B1 * | 10/2011 | Donich et al. | 455/8 |
| 8,862,291 B2 * | 10/2014 | Sharma et al. | 701/19 |
| 2004/0124315 A1 | 7/2004 | Kane et al. | |
| 2005/0137760 A1 * | 6/2005 | Watanabe et al. | 701/19 |
| 2006/0010979 A1 * | 1/2006 | Sakai et al. | 73/598 |
| 2007/0002932 A1 * | 1/2007 | Shirai et al. | 375/141 |
| 2007/0040068 A1 * | 2/2007 | Bartonek | 246/120 |
| 2010/0299007 A1 | 11/2010 | Ghaly | |
| 2011/0006167 A1 * | 1/2011 | Tolmei | 246/121 |
| 2013/0062474 A1 * | 3/2013 | Baldwin et al. | 246/122 R |

* cited by examiner

TRAIN CONTROL SYSTEM

This application is a continuation application of PCT/JP2012/074285, filed on Sep. 21, 2012.

BACKGROUND OF THE INVENTION

1. Field of the Invention

The present invention relates to a train control system, and more specifically, relates to a train control system that can determine that a ground device has failed, to reliably prevent a train from entering a control section of the failed ground device.

2. Description of Related Art

Conventionally, in a train control system using a so-called radio distance measurement system, a vehicle radio set is mounted on a train, and a wireless network is formed between the vehicle radio set and a plurality of wayside radio sets, which is spatially separated and disposed along a wayside of a track on which the train travels, and then, a wireless propagation delay (time) between an on-board antenna of the vehicle radio set and a wayside antenna of the wayside radio set is measured, to detect a train location, so that the train control is performed based on the detected train location.

Furthermore, as such a train control system using the radio distance measurement system, conventionally, for example, a technique including: a wireless train location detecting unit that detects a train location on a predetermined track based on a propagation time of a radio wave between a vehicle radio set mounted on a train travelling on the predetermined track and a ground radio set disposed at a predetermined location on the ground; a travel distance calculating unit that calculates a travel distance of the train on the predetermined track based on an output signal of a tachometer generator connected to an axle of the train; a temporary reference location setting unit that sets the detected train location detected by the wireless train location detecting unit as a predetermined temporary reference location; and a train location detection calculating unit that detects a train location on the predetermined track based on the travel distance calculated by the travel distance calculating unit based on the temporary reference location set by the temporary reference location setting unit, has been disclosed (see, Japanese Laid-open Patent Application Publication No. 2007-331629, for example).

However, in the conventional technique, although there is no problem while each ground device is normally operated, there might have been a problem when a ground device fails, that is, the ground device may fail to transmit information to and receive information from a wayside radio set controlled by the failed ground device. When the ground device has thus failed, there might be a problem in that the transmission of information to and reception of information from the train may fail, so that a location of the train cannot be detected, and thus, travel control of the train cannot be performed, that is, it is extremely dangerous. In addition, there might be another problem in that once the ground device has failed, a complicated restoring work may be required.

SUMMARY OF THE INVENTION

The present invention has been made in view of the above problems, and an object of the present invention is to provide a train control system that can determine that a ground device has failed, to reliably prevent a train from entering a control section of the failed ground device.

To achieve the above object, an aspect of the present invention according to claim 1 provides a train control system including: an on-board device that is mounted on a train travelling on a predetermined track; a vehicle radio set that transmits and receives information of the on-board device; wayside radio sets that are disposed at predetermined locations on a ground; and ground devices that are disposed in every of the control sections defined on the track, in which in each control section, the ground device is connected, in a manner capable of transmission and reception, to the wayside radio sets which belong to the control section, in which when one ground device fails to transmit information to and receive information from another ground device, the one ground device makes a determination that said another ground device has failed, and then, the one ground device calculates a possible travel distance to a control section of the failed ground device to prevent the train from entering the control section of the failed ground device, and then, the one ground device transmits the possible travel distance to the on-board device via the wayside radio sets and the vehicle radio set.

According to an aspect of the invention according to claim 2, in addition to the features of claim 1, the on-board device generates a speed pattern according to the possible travel distance transmitted from the one ground device, to perform travel control of the train based on the speed pattern.

According to an aspect of the invention according to claim 3, in addition to the features of claim 1 or 2, the one ground device is a ground device which is positioned before the failed ground device in a travelling direction of the train with one or more ground devices lying therebetween.

According to the embodiment of the invention according to claim 1, when one ground device fails to transmit information to and receive information from another ground device, the one ground device makes the determination that said another ground device has failed, and then the one ground device calculates the possible travel distance to the control section of the failed ground device to prevent the train from entering the control section of the failed ground device, and then, the one ground device transmits the possible travel distance to the on-board device via the wayside radio sets and the vehicle radio set. Thus, the train can be reliably prevented from entering the section controlled by the failed ground device. As a result, the train can be reliably prevented from being uncontrollable, and in addition, the complicated restoring process can be reduced.

According to the embodiment of the invention according to claim 2, the on-board device generates the speed pattern according to the possible travel distance information transmitted from the one ground device, to perform the travel control of the train based on the speed pattern. Thus, the train can be reliably prevented from entering the section controlled by the failed ground device.

According to the embodiment of the invention according to claim 3, the one ground device is the ground device which is positioned before the failed ground device in the travelling direction of the train with one or more ground devices lying therebetween. Thus, the one ground device can determine that there was failure of the ground device with time to spare, and a distance at that time from the train to the control section of the failed ground device can be prevented from being short, and thus, the train can be reliably stopped before reaching the control section of the failed ground device.

DESCRIPTION OF THE PREFERRED EMBODIMENTS

Hereinbelow, an embodiment of the present invention will be described with reference to the accompanying drawings.

Figure 1:
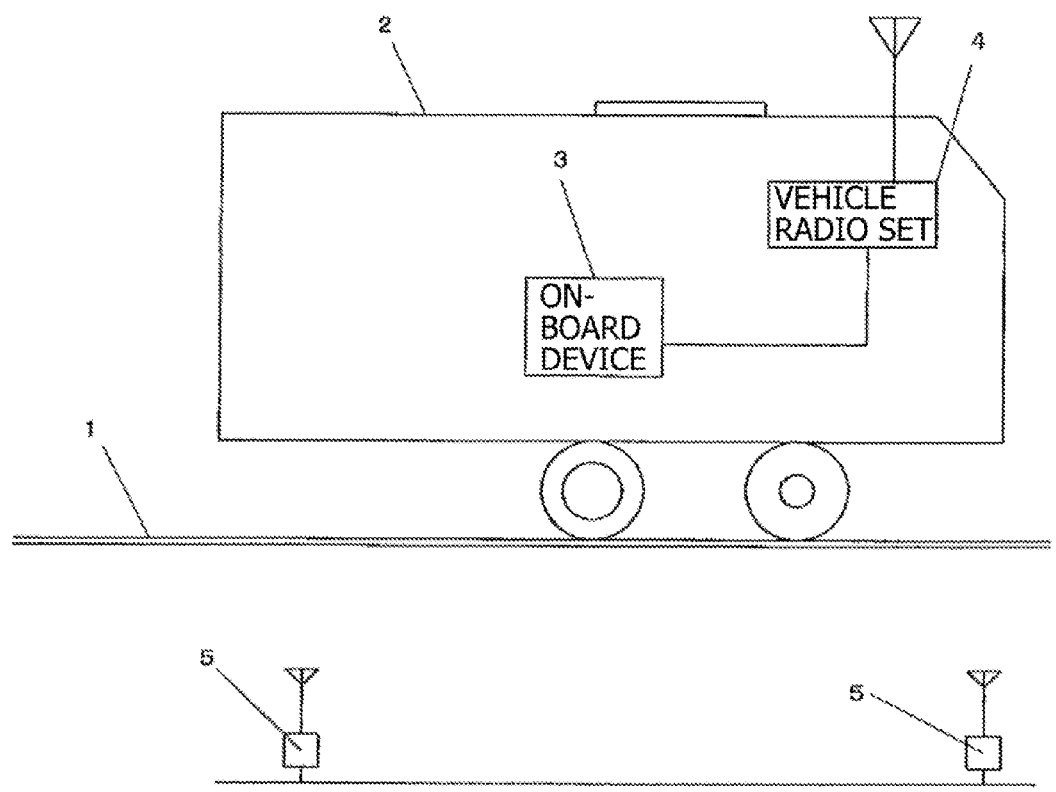
FIG. 1 is a schematic configuration view around a train of a train control system according to an embodiment of the present invention.

FIG. 1 is a schematic configuration view illustrating a train control system according to an embodiment of the present invention. In the present embodiment, on a train 2 that travels on a predetermined track 1, an on-board device 3 is mounted. The on-board device 3 includes a data processing unit (not illustrated), which includes a CPU as a main component, and the on-board device 3 is configured to perform various kinds of control, such as speed control and brake control of the train 2.

Figure 2:
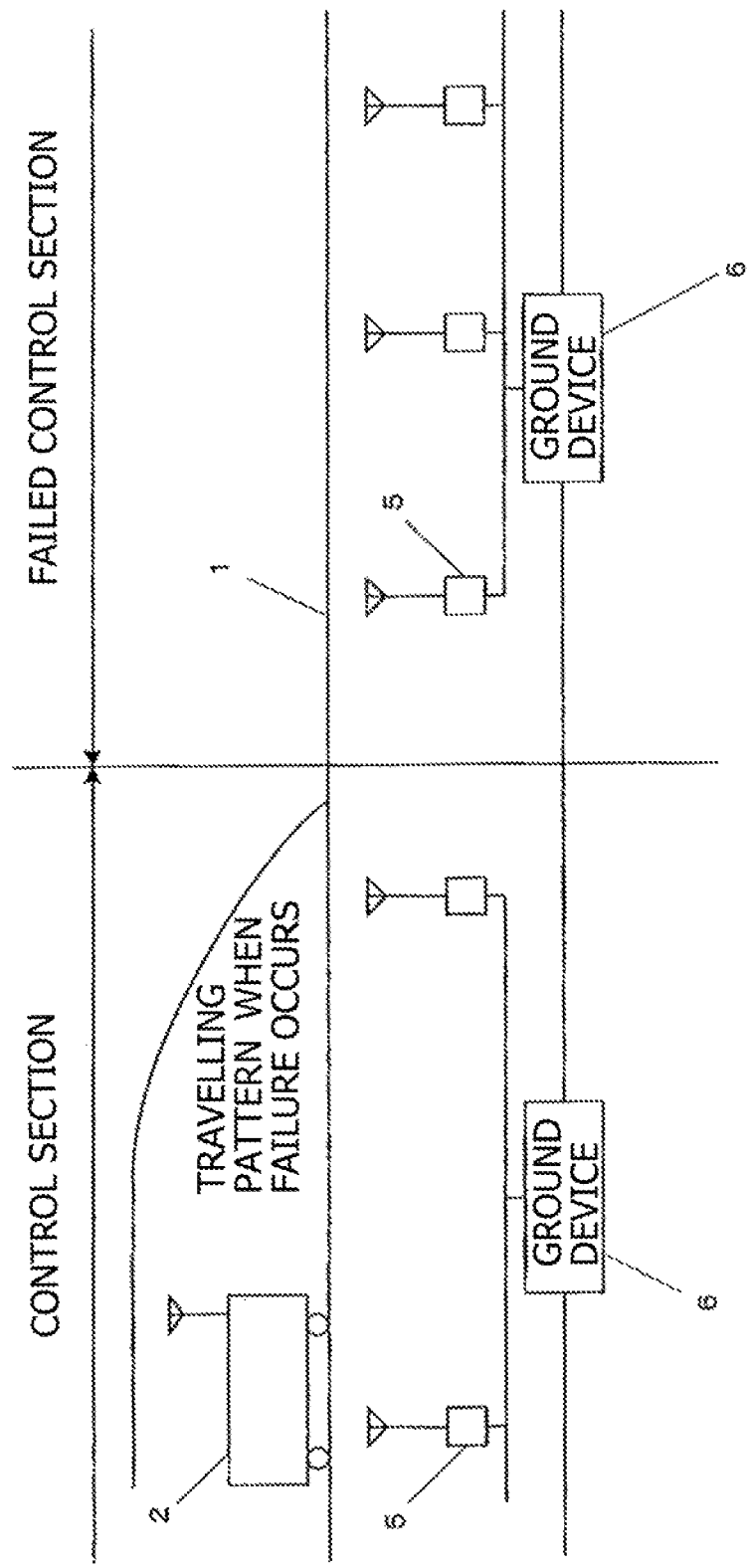
FIG. 2 is a schematic configuration view illustrating the train control system according to the embodiment of the present invention.

Furthermore, on the train 2, a vehicle radio set 4 connected to the on-board device 3 is mounted, and along a wayside of the track 1 of the train 2, a plurality of wayside radio sets 5 that transmits information to and receives information from the vehicle radio set 4 is disposed. Still further, as illustrated in FIG. 2, these wayside radio sets 5 are divided among a plurality of control sections formed along the track 1. In each control section, wayside radio sets 5 belonging thereto are configured to transmit information to and receive information from the vehicle radio set 4 of the train 2 travelling in the same control section as that to which the wayside radio sets 5 belong.

Furthermore, for each control section, a ground device 6 is disposed. To the ground device 6, the wayside radio sets 5, which belong to the same control section as that the ground device 6 is disposed, are connected. The ground devices 6 are connected to each other, and each ground device 6 is configured to transmit information to and receive information from another ground device 6.

Then, each ground device 6 measures a communication time required for a communication between the wayside radio set 5 and the vehicle radio set 4, to calculate a distance between the wayside radio set 5 and the train 2, to thereby detect as to which location in the control section the train 2 exists at that time. Then, the ground device 6 transmits information, such as a speed limit and a possible travel distance, obtained based on the train location information, via the wayside radio sets 5 and the vehicle radio set 4, and the on-board device 3 is configured to generate a speed pattern according to braking performance of the train 2 on which the on-board device 3 is mounted, so that when a running speed exceeds the speed pattern, the on-board device 3 controls a brake device to reduce the running speed to a speed which is not more than the speed pattern.

Here, the ground devices 6 transmit information to and receive information from each other. If one of the ground devices 6 fails for some reason, the other ground devices 6 may fail to transmit information to and receive information from the failed ground device. Thus, in the present embodiment, when one ground device 6 fails to transmit information to and receive information from another ground device 6, the one ground device 6 is configured to make a determination that said another ground device 6 has failed. Then, the one ground device 6 is configured to calculate the possible travel distance to the section controlled by the failed ground device 6 to prevent the train 2 from entering the section controlled by the failed ground device 6. Then, the one ground device 6 is configured to transmit the calculated possible travel distance to the on-board device 3 via the wayside radio sets 5 and the vehicle radio set 4. Then, the on-board device 3 is configured to generate a speed pattern according to the possible travel distance information, to perform the travel control of the train 2 based on the speed pattern.

In a case in which one ground device 6 determines that another ground device 6 has failed, the ground device 6 performing the decision is not limited to a ground device 6 which is next to the failed ground device 6, and a ground device 6 which is positioned before the failed ground device 6 in the travelling direction with one or more ground devices lying therebetween may perform the decision of the failure. Thus, upon deciding that a ground device 6 has failed, when a distance from a location of the train 2 at that time to the control section of the failed ground device 6 is short, a case in which the train 2 cannot be stopped before reaching the control section of the failed ground device 6 can be avoided.

Figure 3:
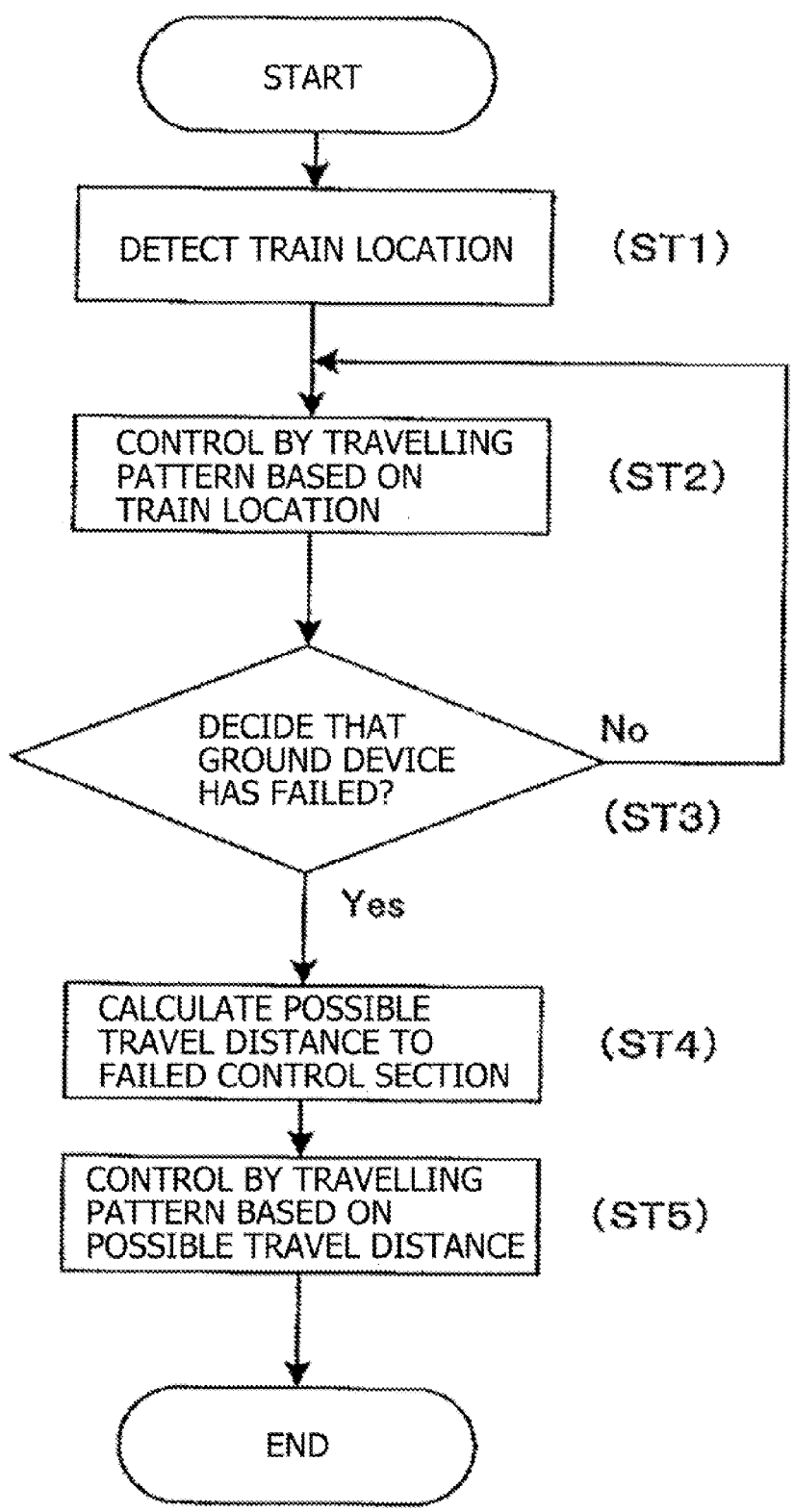
FIG. 3 is a flowchart illustrating an operation of the train control system according to the embodiment of the present invention.

Next, a control operation of the present embodiment will be described with reference to a flowchart of FIG. 3.

First, the wayside radio set 5 and the vehicle radio set 4 communicate with each other, and then, by measuring the communication time thereof, each ground device 6 calculates a distance between the wayside radio set 5 and the train 2, to detect a location of the train 2 at that time (ST1).

Then, the ground device 6 transmits information of a speed limit and a possible travel distance obtained based on the train location information, to the on-board device 3 via the wayside radio sets 5 and the vehicle radio set 4, and the on-board device 3 generates a speed pattern according to brake performance of the train 2 on which the on-board device 3 is mounted, to perform travel control of the train 2 according to the speed pattern (ST2).

Then, when one ground device 6 fails to transmit information to or receive information from another ground device 6, the one ground device 6 makes a determination that said another ground device 6 has failed (ST3), and the one ground device 6 calculates a possible travel distance to a control section of the failed ground device 6 (ST4), and then, the one ground device 6 transmits the possible travel distance to the on-board device 3 via the wayside radio sets 5 and the vehicle radio set 4. Then, the on-board device 3 generates a speed pattern according to the possible travel distance information, to perform travel control of the train 2 based on the speed pattern (ST5). Thus, the train 2 can be prevented from entering the control section of the failed ground device 6.

As described above, in the present embodiment, when the ground device 6 has failed, the possible travel distance to the control section of the failed ground device 6 is calculated, and the obtained possible travel distance is transmitted to the on-board device 3 via the wayside radio sets 5 and the vehicle radio set 4, and then, the on-board device 3 generates the speed pattern according to the possible travel distance, to perform the travel control of the train 2 based on the generated speed pattern. Thus, the train 2 can be reliably prevented from entering the section controlled by the failed ground device 6. As a result, the train 2 can be reliably prevented from being uncontrollable, and in addition, the complicated restoring process can be reduced.

Furthermore, the present invention is not limited to the present embodiment, and various modifications can be made without departing from the scope of the present invention.

It should be noted that the entire contents of Japanese Patent Application No. 2011-218254, filed on Sep. 30, 2011, on which convention priority is claimed, is incorporated herein by reference.

It should also be understood that many modifications and variations of the described embodiments of the invention will be apparent to a person having an ordinary skill in the art without departing from the spirit and scope of the present invention as claimed in the appended claims.

What is claimed is:

1. A train control system comprising:
    an on-board device that is mounted on a train travelling on a predetermined track;
    a vehicle radio set configured to transmit and receive information of the on-board device;
    wayside radio sets that are disposed at predetermined locations on a ground; and
    ground devices that are disposed in every control section defined on the track, the ground devices being connected in a manner capable of transmitting and receiving information with each other and with the wayside radio sets that belong to a respective control section, wherein:
        the ground devices are configured to detect both a train location and a failed ground device that fails to transmit and receive information,
        a ground device that detects the train location is configured to both calculate a travel distance to a control section where the failed ground device is disposed in a travelling direction of the train, and to transmit the travel distance to the on-board device via a wayside radio set and the vehicle radio set, and
        the on-board device is configured to prevent the train from entering the control section where the failed ground device is disposed.

2. The train control system according to claim 1, wherein the on-board device is configured to generate a speed pattern according to the travel distance transmitted from the one ground device that detects the train location, and to control the train based on the speed pattern.

3. The train control system according to claim 1, wherein the ground device that detects the train location is positioned before the failed ground device in the travelling direction of the train with one or more ground devices lying there between.

4. The train control system according to claim 1, wherein the ground devices are further configured to transmit a speed limit obtained from the train location via the wayside radio sets and the vehicle radio set.

5. The train control system according to claim 1, wherein the ground devices are further configured to calculate a distance between one of the wayside radio sets and the train by measuring a communication time between the one of the wayside radio sets and the vehicle radio set to detect the train location.

6. A train controlling method for a system, the system comprising an on-board device that is mounted on a train travelling on a predetermined track; a vehicle radio set that transmits and receives information of the on-board device; wayside radio sets that are disposed at predetermined locations on a ground; and ground devices, each ground device disposed in a section defined on the track, the ground devices being connected in a manner capable of transmission and reception of information with each other and with the wayside radio sets that belong to the control section, wherein the ground devices are configured to detect a train location, the method comprising:
    determining, by a ground device that detects the train location, that a failed ground device has failed to transmit and receive information;
    calculating, with the ground device that detects the train location, a travel distance to the control section where the failed ground device is disposed in a travelling direction of the train;
    transmitting the travel distance to the on-board device via one of the wayside radio sets and the vehicle radio set; and
    controlling the train by the on-board device to prevent the train from entering the control section where the failed ground device is disposed.

7. The train controlling method according to claim 6, further comprising, with the on-board device:
    generating a speed pattern according to the travel distance via one of the wayside radio sets and the vehicle radio set, and
    controlling the train based on the speed pattern.

8. The train controlling method according to claim 6, wherein the ground device that detects the train location is positioned before the failed ground device in the travelling direction of the train with one or more ground devices lying there between.

9. The train controlling method according to claim 6, further comprising transmitting, with one of the ground devices, a speed limit to the on-board device, via one of the wayside radio sets and the vehicle radio set.

10. The train controlling method according to claim 6, further comprising:
    measuring a communication time required for a communication between one of the wayside radio sets and the vehicle radio set;
    calculating a distance between the one of the wayside radio sets and the train using the communication time; and
    detecting a train location in the control section.

11. A train controlling method for a system, the system comprising an on-board device that is mounted on a train travelling on a predetermined track; a vehicle radio set that transmits and receives information of the on-board device; wayside radio sets that are disposed at predetermined locations on a ground; and ground devices, each ground device disposed in a control sections-defined on the track, the ground devices being connected in a manner capable of transmission and reception of information with each other and with one of the wayside radio sets that belongs to the control section, wherein the ground devices are configured to detect a train location, the method comprising:
    calculating a distance between the wayside radio set and the train by each ground device by performing a communication between one of the wayside radio sets and the vehicle radio set and by measuring a communication time thereof so as to detect a location of the train;
    transmitting information of a speed limit obtained based on the train location information from the ground device to the on-board device via one of the wayside radio sets and the vehicle radio set;
    generating a first speed pattern by the on-board device according to brake performance of the train on which the on-board device is mounted, and performing travel control of the train based on the first speed pattern;
    determining, by a ground device that detects the train location, that a failed ground device has failed to transmit and receive information;
    calculating a travel distance from the ground device that detects the train location to the control section of the failed ground device in a travelling direction of the train by the ground device that detects the train location;
    transmitting the travel distance to the on-board device via the wayside radio sets and the vehicle radio set;

generating a second speed pattern by the on-board device
according to the travel distance; and controlling the train based on the second speed pattern.

12. The train controlling method according to claim 11, further comprising preventing the train from entering the control section where the failed ground device is disposed.

13. The train controlling method according to claim 11, further comprising controlling, with the on-board device, a brake device to reduce a running speed of the train to a speed which is less than or equal to the first speed pattern when a running speed exceeds the first speed pattern.

\* \* \* \* \*